United States Patent
Aderhold et al.

[11] Patent Number: 6,164,816
[45] Date of Patent: Dec. 26, 2000

[54] TUNING A SUBSTRATE TEMPERATURE MEASUREMENT SYSTEM

[75] Inventors: Wolfgang Aderhold, Cupertino; Abhilash J. Mayur, Salinas; Peter A. Knoot, San Carlos, all of Calif.

[73] Assignee: Applied Materials, Inc., Santa Clara, Calif.

[21] Appl. No.: 09/133,993

[22] Filed: Aug. 14, 1998

[51] Int. Cl.[7] ................................ G01K 15/00
[52] U.S. Cl. .......................... 374/1; 374/124; 374/141; 702/130; 356/43
[58] Field of Search .................... 374/101, 110, 374/124, 178, 1, 141; 392/416, 418; 219/390, 405, 411; 118/724; 356/43, 44, 45, 381, 382; 438/5, 16, 17, 18; 702/34, 35, 65, 58, 59, 81, 82, 83, 84, 99, 104, 117, 130, 132, 133, 134, 135, 136, 170, 172, 183, 184, 185, FOR 105, FOR 124, FOR 125, FOR 137, FOR 139, FOR 142, FOR 148, FOR 158

[56] References Cited

U.S. PATENT DOCUMENTS

| | | |
|---|---|---|
| 3,796,099 | 3/1974 | Shimotsuma et al. . |
| 4,408,878 | 10/1983 | Fischbach . |
| 4,611,930 | 9/1986 | Stein . |
| 4,659,234 | 4/1987 | Brouwer et al. . |
| 4,708,474 | 11/1987 | Suarez-Gonzalez . |
| 4,881,823 | 11/1989 | Tanaka et al. . |
| 4,919,542 | 4/1990 | Nulman et al. . |
| 4,956,538 | 9/1990 | Moslehi . |
| 4,975,827 | 12/1990 | Yonezawa ................... 364/151 |
| 4,979,134 | 12/1990 | Arima et al. . |
| 5,011,295 | 4/1991 | Krishnan et al. . |
| 5,029,117 | 7/1991 | Patton . |
| 5,226,732 | 7/1993 | Nakos et al. . |
| 5,326,171 | 7/1994 | Thompson et al. . |
| 5,444,815 | 8/1995 | Lee et al. ................... 392/416 |
| 5,446,825 | 8/1995 | Moslehi et al. ............. 392/416 |
| 5,561,612 | 10/1996 | Thakur ..................... 364/557 |
| 5,660,472 | 8/1997 | Peuse et al. . |
| 5,712,467 | 1/1998 | Straka et al. ............... 702/104 |
| 5,755,511 | 5/1998 | Peuse et al. . |

FOREIGN PATENT DOCUMENTS

| | | |
|---|---|---|
| 0 612 862 A1 | 8/1994 | European Pat. Off. . |
| 0 805 342 A1 | 11/1997 | European Pat. Off. . |

OTHER PUBLICATIONS

Pikashov et al., Determining Emissivity and True Surface Temperature By Means Of A Pyrometer And An Attachment, Gas Institute, Kiev., translated from inzhenerno–Fizicheskii Zhurnal, 16, 723–730 (1969).

Roozeboom, F., "Rapid Thermal Processing: Status, Problems and Options After the First 25 Years", Materials Research Society Symposium Proceedings (1993) vol. 303, pp. 149–164 Apr., 1993.

(List continued on next page.)

*Primary Examiner*—Diego Gutierrez
*Assistant Examiner*—Lydia M De Jesús
*Attorney, Agent, or Firm*—Fish & Richardson P.C.

[57] ABSTRACT

A technique and system for tuning temperature sensor readings in a thermal processing chamber includes determining an actual temperature profile for a substrate based on measurements of the substrate. A simulated temperature profile for the substrate is calculated using a respective interim temperature correction value for one or more temperature sensors associated with the chamber. A Gaussian-like distribution for thermal contributions from multiple radiation sources in the chamber can be used to simulate the temperature profile. The simulated temperature profile and the actual temperature profile are combined to form an estimated temperature profile. A final value for each respective temperature correction value is determined using an optimization algorithm which results in the estimated temperature profile being substantially uniform across the surface of the substrate. Each final temperature correction value is used as an offset to temperature measurements obtained from the corresponding temperature sensors.

25 Claims, 5 Drawing Sheets

OTHER PUBLICATIONS

Roozeboom, F., "Manufacturing Equipment Issues in Rapid Thermal Processing", Rapid Thermal Processing Science and Technology, pp. 349–423 (1993).

Sorrell et al., "Temperature Uniformity in RTP Furnaces", IEEE Transactions on Electron Devices, Jan. 1992, vol. 39, No. 1, pp. 75–80.

Norman, S., "Optimization of Transient Temperature Uniformity in RTP Systems", IEEE Transactions on Electron Devices, Jan. 1992, vol. 39, No. 1, pp. 205–207.

Gyurcsik et al., "A Model for Rapid Thermal Processing: Achieving Uniformity Through Lamp Control", IEEE Transactions on Semiconductor Manufacturing, Feb. 1991, vol. 4, No. 1, pp. 9–13.

Dilhac et al., "Temperature Control in a Rapid Thermal Processor", IEEE Transactions on Electron Devices, Jan. 1992, vol. 39, No. 1, pp. 201–203.

Apte and Saraswat, Rapid Thermal Processing Uniformity Using Multivariable Control of a Circularly Symmetric 3 Zone Lamp, IEEE Transactions on Semiconductor Manufacturing, Aug. 1992, vol. 5, No. 3, pp. 180–188.

Deardorff, D., "Elimination of reflection errors in emissometers by using alternate apertures", Review of Scientific Instruments, Oct. 1976, Vo. 47, No. 10, pp. 1279–1282.

A. Gouffe, Revue D'optique 14, 1–10 (1945) with translation.

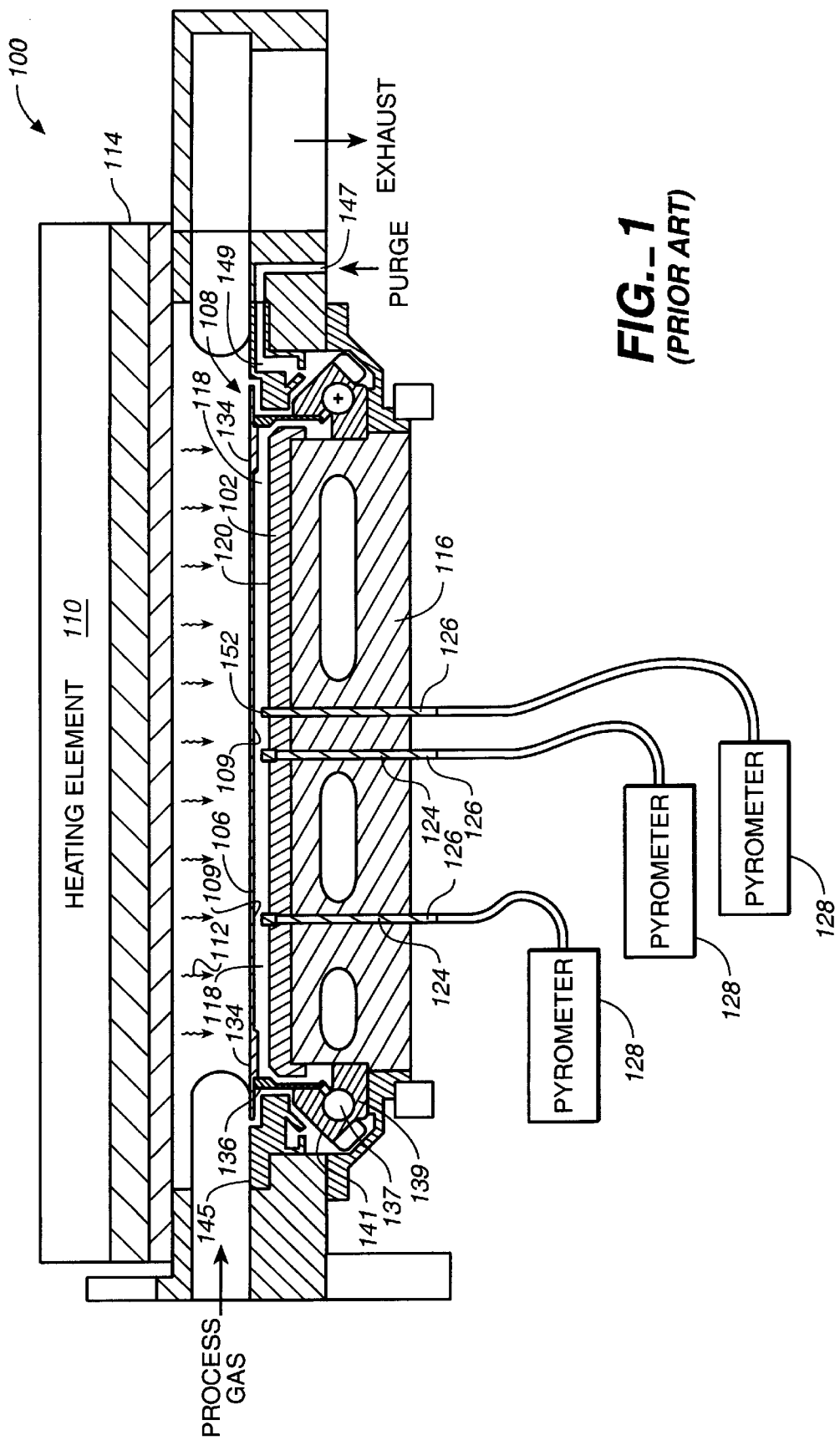
FIG._1 (PRIOR ART)

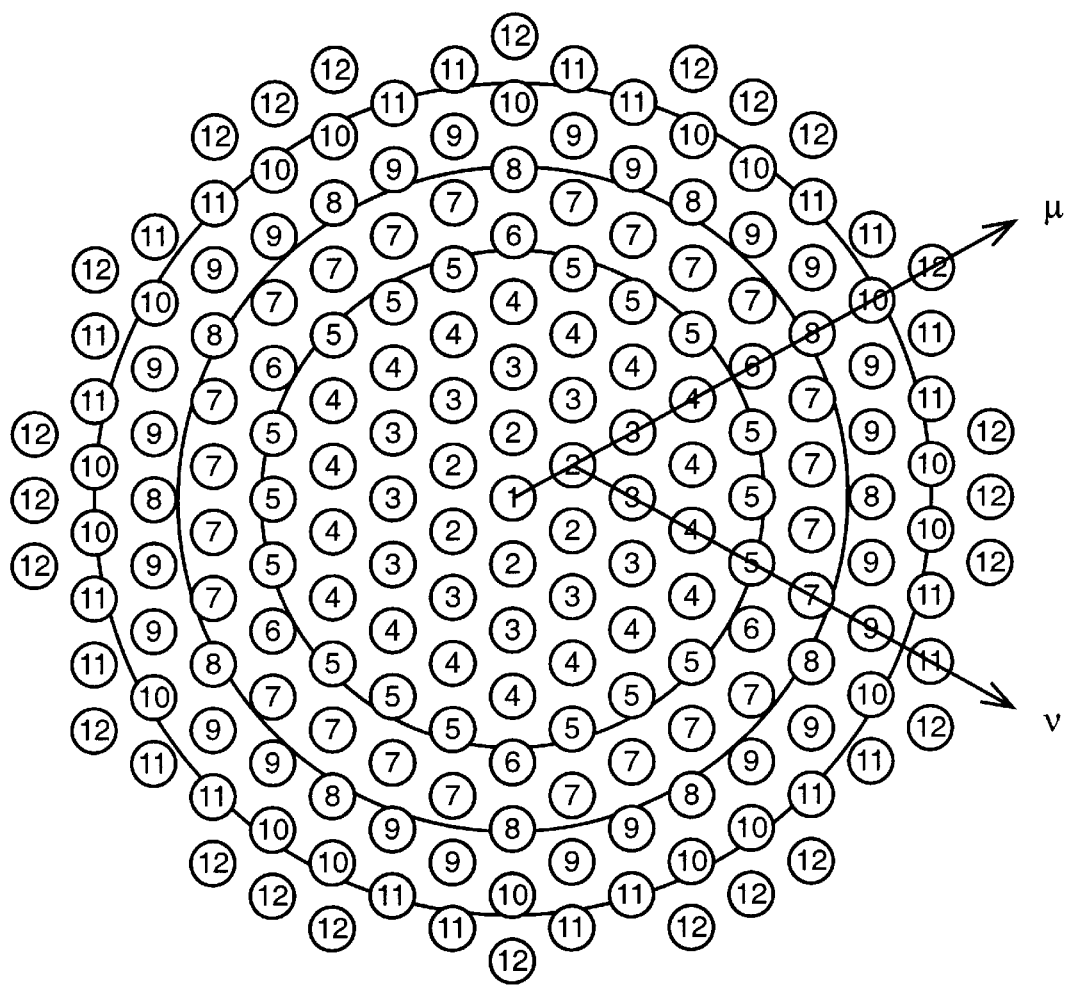
FIG._2

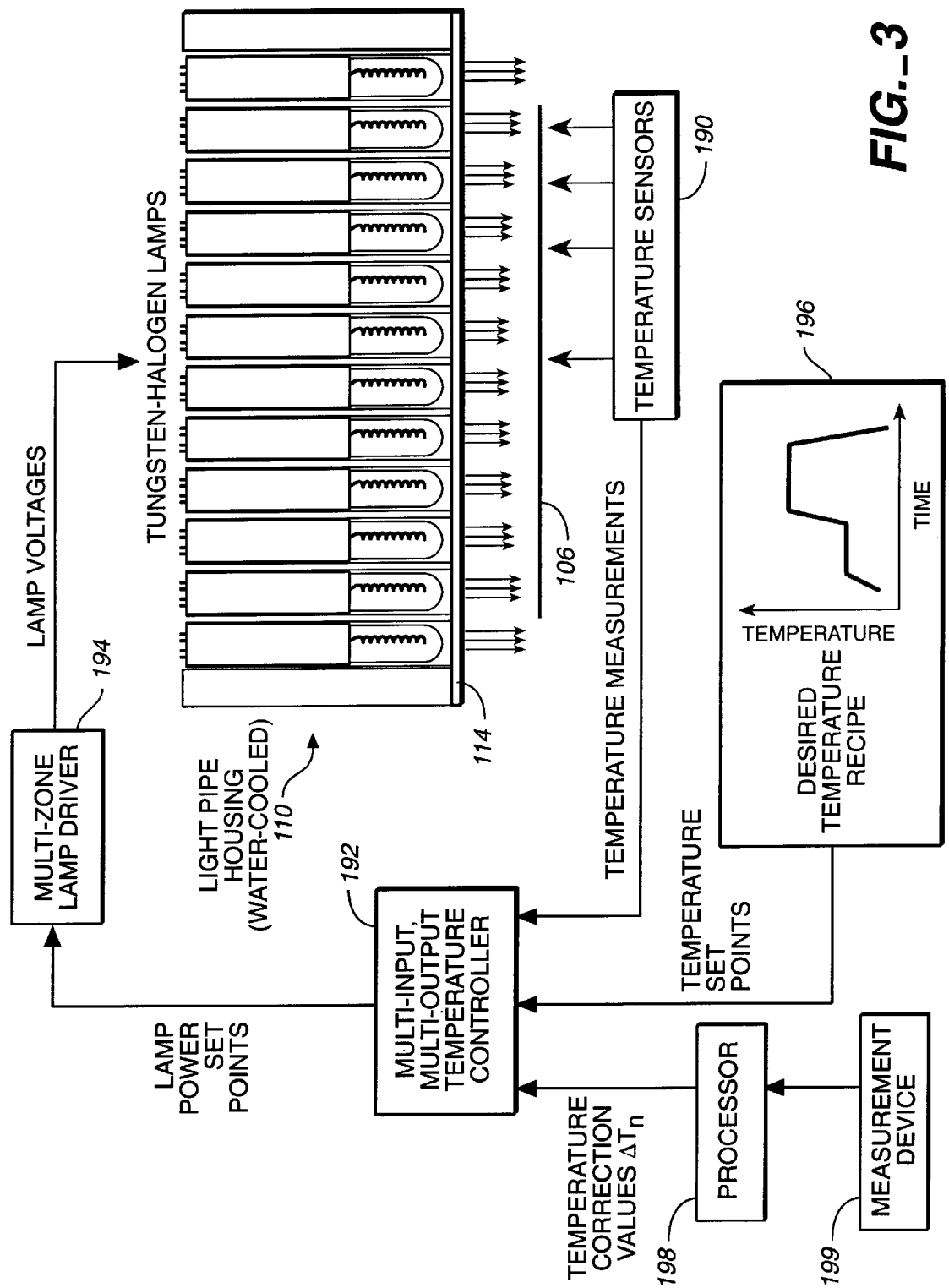
FIG._3

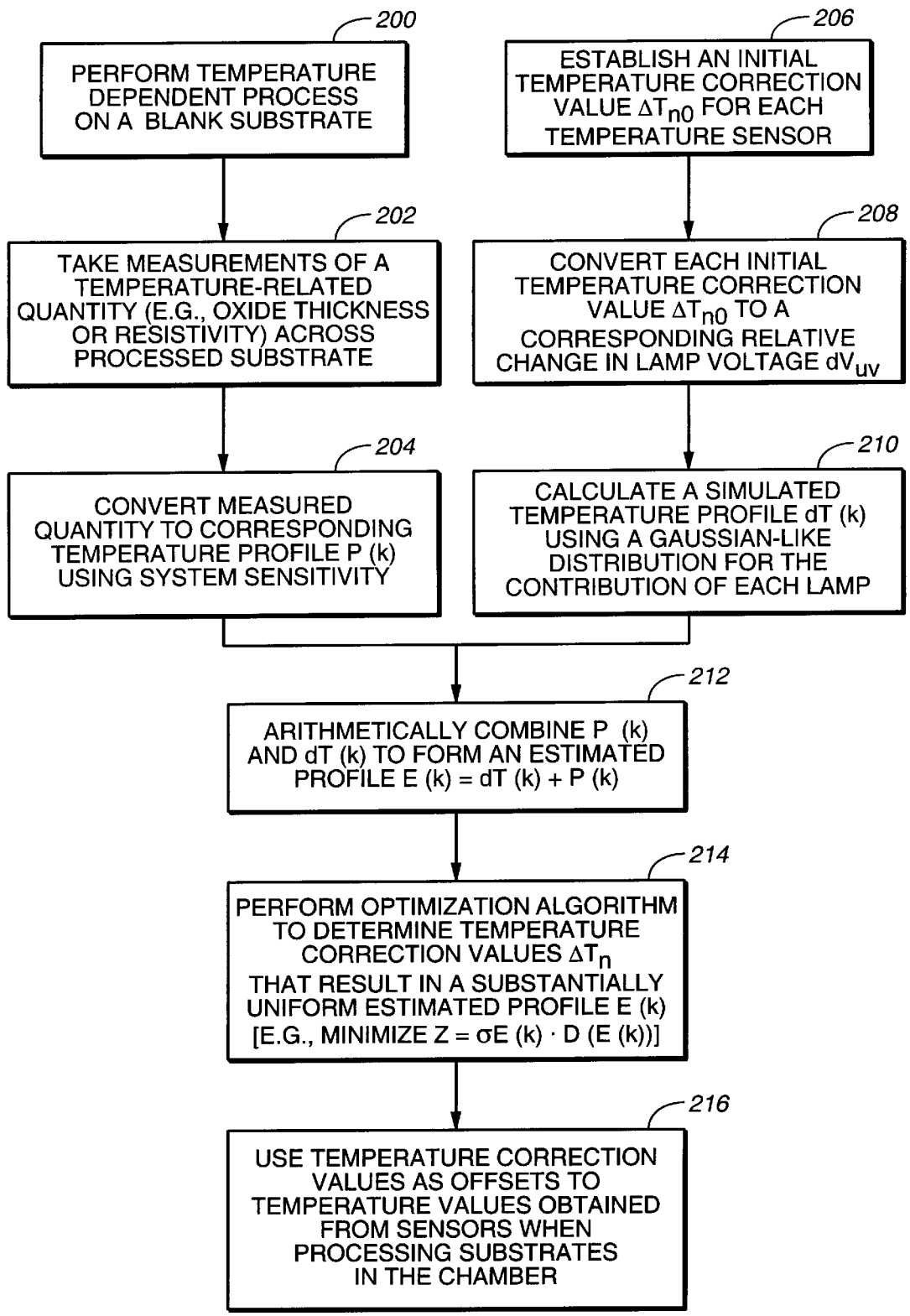
FIG._4

CORRESPONDING LAMP GROUP
FOR EACH LAMP Lu, v

| u,v → ↓ | 0 | 1 | 2 | 3 | 4 | 5 | 6 |
|---|---|---|---|---|---|---|---|
| 6 | 12 | X | X | X | X | X | X |
| 5 | 10 | 11 | X | X | X | X | X |
| 4 | 8 | 9 | 11 | 12 | X | X | X |
| 3 | 6 | 7 | 9 | 10 | 12 | X | X |
| 2 | 4 | 5 | 7 | 8 | 10 | 12 | X |
| 1 | 3 | 4 | 5 | 7 | 9 | 11 | X |
| 0 | 2 | 3 | 4 | 5 | 7 | 9 | 11 |
| -1 | 1 | X | X | X | X | X | X |

FIG._5

LAMP GROUPS CORRESPONDING TO
EACH LAMP VOLTAGE

| LAMP VOLTAGE | LAMP GROUP(S) |
|---|---|
| $V_1$ | 1, 2 |
| $V_2$ | 3 |
| $V_3$ | 4 |
| $V_4$ | 5, 6 |
| $V_5$ | 7, 8 |
| $V_6$ | 9, 10, 11, 12 |
|  |  |
|  |  |

FIG._6

TUNING A SUBSTRATE TEMPERATURE MEASUREMENT SYSTEM

BACKGROUND OF THE INVENTION

The invention relates to techniques for making improved non-contact temperature measurements of a semiconductor or other substrate.

In many semiconductor device manufacturing processes, the required high levels of device performance, yield, and process repeatability can only be achieved if the temperature of a substrate (e.g., a semiconductor wafer) is tightly controlled during processing. To achieve that level of control, it is often necessary to measure the substrate temperature in real time and in situ, so that any unexpected temperature variations can be immediately detected and corrected for.

Consider, for example, rapid thermal processing (RTP), which is used for several different fabrication processes, including rapid thermal annealing (RTA), rapid thermal cleaning (RTC), rapid thermal chemical vapor deposition (RTCVD), rapid thermal oxidation (RTO), and rapid thermal nitridation (RTN). In the particular application of CMOS gate dielectric formation by RTO or RTN, thickness, growth temperature, and uniformity of the gate dielectrics are critical parameters that influence the overall device performance and fabrication yield. Currently, CMOS devices are being made with dielectric layers that are only 60–80 Å thick and for which thickness uniformity must be held within ±2 angstroms (Å). That level of uniformity requires that temperature variations across the substrate during high temperature processing not exceed a few degrees celsius (° C.).

The wafer itself often cannot tolerate even small temperature differentials during high temperature processing. If the temperature difference is allowed to rise above 1–2° C./cm at temperatures around 1000° C., the resulting stress is likely to cause slip in the silicon crystal. The resulting slip planes will destroy any devices through which they pass. To achieve that level of temperature uniformity, reliable real-time, multi-point temperature measurements for closed-loop temperature control are necessary.

Optical pyrometry is being widely used for measuring temperatures in RTP systems. Pyrometry exploits a general property of objects, namely, that objects emit radiation with a particular spectral content and intensity that is characteristic of their temperature. Thus, by measuring the emitted radiation, the object's temperature can be determined. A pyrometer measures the emitted radiation intensity and performs the appropriate conversion to obtain temperature.

One difficulty encountered in the use of pyrometers for measuring substrate temperature in an RTP system is that variations between individual temperature sensors and differences in their position with respect to a particular substrate in the chamber can affect the accuracy of the temperature measurements. Therefore, substrate temperature measurements obtained from the sensors can have an unknown error component attributable to such variations. Those variations show up, for example, as differences in the thickness of a deposited layer across the substrate surface because the sensors are used as part of the closed-loop temperature control.

One way to address such errors is to reduce or increase a temperature offset at the location of the temperature deviation. If the location of the temperature deviation matches the position of a temperature probe, then the amount of temperature change necessary to correct the deviation is approximately proportional to the amount of deviation in the thickness of the deposited layer. Such a technique, however, assumes localized heating from the heat source. However, due to cross-coupling between lamp zones, thermal discontinuities at the substrate edge, and the viewing angle of the probes, such an assumption generally is not valid. Thus, additional techniques are required for obtaining accurate substrate temperature measurements to provide uniform processing conditions across the substrate surface.

SUMMARY

In general, in one aspect, a method of tuning temperature sensor readings in a thermal processing chamber includes determining an actual temperature profile for a substrate or an actual profile of a temperature-related quantity for the substrate based on measurements of the substrate. A simulated temperature profile for the substrate is calculated using a respective interim temperature correction value for one or more temperature sensors associated with the chamber. The simulated temperature profile and the actual profile are combined to form an estimated profile. A final value for each respective temperature correction value is determined using an optimization algorithm which results in the estimated profile being substantially uniform across the surface of the substrate. Each final temperature correction value is used as an offset to temperature measurements subsequently obtained from the corresponding temperature sensors.

In another aspect, a system for tuning multiple temperature sensors that measure temperatures of a substrate includes a processor arranged to obtain an actual temperature profile for the substrate or an actual profile of a temperature-related quantity for the substrate. The processor is configured to perform the following functions: (a) calculate a simulated temperature profile for the substrate based on respective interim temperature correction values for the plurality of temperature sensors; (b) arithmetically combine the simulated temperature profile and the actual profile to form an estimated profile; (c) determine a final value for each respective temperature correction value by repeating functions (a) and (b) until the estimated profile is substantially uniform across the surface of the substrate; and (d) use each final value as an offset to temperature measurements subsequently obtained from a corresponding one of the temperature sensors.

In some implementations, one or more of the following features are present. To calculate the simulated temperature profile, a bell-shaped distribution for thermal contributions from multiple radiation sources in the chamber can be used. For the purposes of the present invention, a bell-shaped distribution includes, but is not limited to, a Pearson distribution, including a normal distribution, as well as Gaussian and Gaussian-like distributions. The peak amplitude for each radiation source can be assumed to be located at the radial position corresponding to that radiation source. The temperature profiles from each of the radiation sources can be determined by adding the individual contributions from each radiation source.

To determine the actual profile, measurements of a temperature-related quantity can be made, and the temperature-related quantity can be converted to the actual temperature profile. The temperature-related quantity can be, for example, thickness measurements of a layer deposited on the substrate during the thermal process or resistivity measurements. Measurements of other temperature-related quantities also can be used if a known relationship exists between the measured quantity and substrate temperature.

In one implementation, the simulated temperature profile and the actual profile can be combined arithmetically, for example, by calculating the sum of the actual temperature profile and the simulated temperature profile. Determining a final value for each respective temperature correction value can include minimizing a value that is a function of a standard deviation of the estimated temperature profile and that is a function of a deviation of the estimated temperature profile for points on the substrate weighted according to radial position.

The tuning procedure is simple and typically only needs to be implemented once for a given chamber structure. More accurate temperature measurements can be obtained during substrate processing by correcting for variations between individual temperature sensors and differences in their position with respect to a particular substrate. More accurate temperature readings can help provide more uniform layers on a substrate processed in the chamber. The invention, therefore, enables reliable temperature measurements with enhanced repeatability and uniformity.

Other features and advantages will be apparent from the following detailed description, the accompanying drawings and the claims.

BRIEF DESCRIPTION OF THE DRAWINGS

FIG. 1 is a cross-sectional side view of a rapid thermal processing (RTP) system;

FIG. 2 illustrates an exemplary lamp configuration for a heating element in the system of FIG. 1.

FIG. 3 illustrates a control loop for heating a substrate in the system of FIG. 1.

FIG. 4 illustrates a technique to calculate correction values for temperatures obtained from temperature sensors in the system of FIG. 1.

FIGS. 5–6 illustrate further details of an exemplary lamp configuration for the heating element.

DETAILED DESCRIPTION

As shown in FIG. 1, a rapid thermal processing (RTP) system includes a processing chamber 100 for processing a disk-shaped, eight inch (200 mm) diameter silicon substrate 106. The substrate 106 is mounted inside the chamber on a substrate support structure 108 and is heated by a heating element 110 located directly above the substrate. The heating element 110 generates radiation 112 which enters the processing chamber 100 through a water-cooled quartz window assembly 114 above the substrate. Beneath the substrate 106 is a reflector 102 which is mounted on a water-cooled, stainless steel base 116. The reflector 102 is made of aluminum and has a highly reflective surface coating 120. The underside of substrate 106 and the top of reflector 102 form a reflecting cavity 118 for enhancing the effective emissivity of the substrate.

The temperatures at localized regions 109 of substrate 106 are measured by multiple temperature probes 126 coupled to respective pyrometers 128 (only three of which are shown in FIG. 1). The temperature probes 126 are sapphire light pipes that pass through respective conduits 124 extending from the backside of the base 116 through the top of the reflector 102. Sapphire light pipes are generally preferred because they have relatively small scattering coefficients and they tend to have greater transverse light rejection, thus they provide greater measurement localization. However, the light pipes can be made of any appropriate heat-tolerant and corrosion-resistant material, e.g., quartz, that can transmit the sampled radiation to the pyrometer. Suitable quartz fiber light pipes, sapphire crystal light pipes, and light pipe/conduit couplers may be obtained from the Luxtron Corporation-AccuFiber Division in Santa Clara, Calif. Alternatively, the radiation sampling system can be an optical system that includes a small-radius objective lens mounted in the reflector 102 and a system of mirrors and lenses which communicate radiation collected by the lens to the pyrometer. Such a technique may be less expensive than sapphire light pipes if appropriate off-the-shelf optical elements can be found. Alternatively, light pipes also can be made from a tube with a highly polished reflective inner surface. In the described embodiment, the pyrometers 128 have a narrow bandwidth (e.g., about 40 nm) located at about 950 nm. Suitable pyrometers 128 also may be obtained from the Luxtron Corporation-AccuFiber Division in Santa Clara, Calif.

The described implementation actually has eight measurement probes distributed over the reflector which can be used to measure the temperature at different radii of the substrate. During thermal processing, support structure 108 is rotated at about 90 rotations per minute (RPM). Thus, each probe actually samples the temperature profile of a corresponding annular ring area on the substrate. In some implementations, fewer than all the probes are used.

The support structure which rotates the substrate includes a support ring 134 which contacts the substrate around the substrate's outer perimeter, thereby leaving all of the underside of the substrate exposed except for a small annular region about the outer perimeter. To minimize the thermal discontinuities that will occur at the edge of substrate 106 during processing, support ring 134 is made of the same, or similar, material as the substrate, e.g. silicon or silicon carbide.

The support ring 134 rests on a rotatable tubular quartz cylinder 136 that is coated with silicon to render it opaque in the frequency range of the pyrometers. The silicon coating on the quartz cylinder acts as a baffle to block out radiation from external sources that might contaminate the intensity measurements. The bottom of the quartz cylinder is held by an annular upper bearing race 141 which rests on a plurality of ball bearings 137 that are, in turn, held within an stationary, annular, lower bearing race 139. The ball bearings 137 are made of steel and coated with silicon nitride to reduce particulate formation during operation. Upper bearing race 141 is magnetically-coupled to an actuator (not shown) which rotates cylinder 136, support ring 134 and substrate 106 at about 90 RPM during thermal processing. The support ring 134 is designed to create a light tight seal with the quartz cylinder 136. A purge ring 145 that is fitted into the chamber body surrounds the quartz cylinder. The purge ring 145 has an internal annular cavity which opens up to a region above upper bearing race 141. The internal cavity is connected to a gas supply (not shown) through a passageway 147. During processing, a purge gas is flowed into the chamber through purge ring 145.

A suitable heating element 110 is disclosed in U.S. Pat. No. 5,155,336, incorporated herein by reference. This heating element uses 187 light pipes to deliver highly collimated radiation from tungsten-halogen lamps to the processing chamber 100. Each lamp in the heating element 110 can be identified by indices (u,v) (see FIG. 2). The lamps are divided into twelve groups (1–12) which are located in a radially symmetrical manner. The twelve groups can be grouped together to provide six control zones (FIG. 6), although the particular arrangement depends on the configuration of the chamber. Thus, for example, the center lamp, which is identified by indices (−1, 0), is located in group 1 which is in zone Z1. The zones can be adjusted individually to control the radiative heating of different areas of the substrate 106.

FIG. 3 illustrates a control loop for heating the substrate to the desired temperature. It uses the sampled output from temperature sensors 190 (i.e., the pyrometers 128 and the light pipes 126). The heating element 110 includes 187 tungsten-halogen lamps that are arranged in radial zones. Each zone of lamps is separately powered by a multi-zone lamp driver 194 that is, in turn, controlled by a multi-input, multi-output controller 192. Since the substrate rotates at about 90 rpm and temperature measurements are made at different radial locations on the backside of the substrate 106, each temperature sensor produces an average temperature over a different annular region of the substrate. The annular regions coincide with the radial zones of the heat lamp.

The controller 192 receives the temperature measurements that are generated by the temperature sensors 190, corrects the temperatures based upon a temperature correction algorithm, and adjusts the power level of the heating lamps to achieve a substrate temperature as specified by a predefined temperature cycle profile 196 that is supplied to the controller 192. To determine the power level of the heating lamps, the controller 192 uses a matrix G which describes the mathematical relationship between a desired change in power supplied to the lamps in a particular zone and a corresponding change in temperature. More precisely, the matrix G describes the relationship between a change in lamp voltage and the corresponding change in temperature, in other words, $$dV_n \times G = dT_n, \qquad (EQ1)$$

where $dV_n$ is the voltage change in lamp zone n, and $dT_n$ is the change in temperature at the radial location of the temperature probe n, where n is an index for the sensors. The specific details of the matrix G will vary from one system to another and can be derived experimentally.

The temperature correction algorithm makes certain adjustments to the temperature measurements obtained from the sensors 190. Such adjustments are necessary because slight discrepancies typically exist between the temperatures obtained from the sensors 190 and the actual substrate temperature. Throughout the process cycle, the controller automatically adjusts the power levels delivered to the different lamp zones so that any temperature deviations away from the desired temperature profile are corrected for.

Before describing the technique for calculating the temperature correction values in greater detail, it is helpful to define a sensitivity s for the thermal processing system. The sensitivity s is an experimentally-determined parameter whose value can be established by repeatedly performing a thermal process, such as an oxidation process, at different temperatures in the process chamber 100. The average thickness of the oxide thickness is measured for each temperature. The slope of average thickness versus temperature is an indication of the system sensitivity s in angstroms per degree Celsius (Å/° C.). Alternatively, after repeatedly performing a thermal process in the chamber 100, another temperature-dependent quantity, such as resistivity of the deposited layer, is measured. The slope of average resistivity versus temperature provides the sensitivity s in ohms per degree Celsius.

FIG. 4 illustrates a technique to calculate a correction value $\Delta T_n$ for the temperature obtained from each sensor 190 (i.e., the pyrometers and light pipes). First, as indicated by step 200, a blank wafer or substrate is placed in the processing chamber 100 and a temperature-dependent process is performed. The temperature-dependent process can include, for example, an oxidation process or an implant anneal process. In general, however, any temperature-dependent process that results in a known correlation between substrate temperature and some other measurable quantity, such as film thickness or resistivity, can be used. Preferably, the relationship between temperature and the measurable quantity is substantially linear.

Once the temperature-dependent process has been performed, the substrate is removed from the chamber 100 and measurements of a temperature-related quantity M(k) are taken across the radius of the substrate using a measurement device 199 (step 202). For example, if an oxidation process was performed in step 200, then thickness measurements of the oxide layer can be made. An ellipsometer can be used, for example, to make the thickness measurements. Alternatively, if a silicidation process was performed in step 200, then measurements of resistivity can be made. A thin film resistivity measuring apparatus, such as a four-point probe, can be used to make the resistivity measurements. Other techniques and measurement devices can be used to obtain the measurements of the temperature-related quantity.

In one implementation, multiple measurements of the temperature-related quantity are made at various points k along a radius of the substrate. For example, measurements of the temperature-related quantity can be made at twenty five points k from the center of the substrate to its edge. In another implementation, one measurement is taken at the center of the substrate and two or more measurements are taken at each of another twenty-four radial distances between the center and the edge of the substrate. The measurements taken at a given radial distance from the center can be combined to obtain an average measurement for each radial distance. The profile M(k) should reflect changes in the measured quantity across the surface of the substrate, rather than absolute measurement values, and reflects a one-dimensional profile along the radius of the substrate.

The measured values of the temperature-related quantity M(k) are converted to a temperature profile P(k) using the known relationship between the measured quantity and the temperature (step 204). In other words, the system sensitivity s of the chamber 100 is used to convert the measured quantities M(k) (e.g., oxide thickness or resistivity) to the corresponding temperature profile P(k) according to equation EQ2:

$$P(k) = [(M(k) - M_{means})/s] + P_0(M_{mean}) \qquad (EQ2),$$

where $$M_{mean} = \frac{1}{K_{max}+1} \sum_{k=0}^{k_{max}} M(k), \qquad (EQ2A)$$

$P_0(M_{mean})$ is the temperature corresponding to $M_{mean}$, and k is point resolution (e.g., k=[0, 1, 2, . . . , 24].

A processor, such as the controller 192 or a separate general purpose computer or processor 198, can be configured and programmed to perform the conversion automatically. The temperature profile P(k) reflects changes in temperature and reflects a one-dimensional temperature profile along the radius of the substrate.

In one implementation, for example, the measured profile M(k) is entered into the processor 198 using, for example, a keyboard. Alternatively, the data for the profile M(k) can be stored on a magnetic, optical or other storage medium and subsequently transferred to the processor 198. In yet other implementations, the measured profile M(k) can be obtained or received automatically by the processor 198 from the measurement device 199.

Once the processor 198 obtains or receives the measured profile M(k), the correction values $\Delta T_n$ are calculated by the processor 198, as explained below, and then are entered into the controller 192. In yet other implementations, the apparatus for obtaining the temperature correction values $\Delta T_n$ can be formed as part of a single overall temperature processor, such as the controller 192.

In general, the processor 198 executes a program for a simulated temperature correction profile dT(k) across the plane of the substrate and determines an optimal set of temperature correction values $\Delta T_n$ for the sensors 190. The simulated temperature profile dT(k) is a continuous differential profile and is discussed in greater detail below. The temperature correction values for each of the sensors 190 may vary from one another, and may have positive, negative or zero values.

To obtain the differential temperature correction profile dT(k), an initial temperature correction value $\Delta T_{n0}$ is established for each sensor 190 (step 206). The initial temperature correction values $\Delta T_{n0}$ can be set to zero or can be set to values which represent educated guesses based on the temperature profile P(k) obtained from the actual measurements. For example, the initial correction values might be ±1 or ±2° C. Alternatively, the following technique can be used to select the initial temperature correction values $\Delta T_{n0}$. For each sensor 190, a mean temperature is calculated using a predetermined number of points that are centered about the position of the particular sensor. For example, if the viewing angle of each probe is an area having a diameter of about 1 centimeter (cm), then five equally-spaced points on the substrate in the vicinity of each particular probe can be used to obtain an average temperature value $T_{n(mean)}$ for that probe. In other words, $$T_n(\text{mean}) = \frac{1}{5} \sum_{k=k_n}^{k_n+4} P(k), \qquad (EQ3)$$

where $k_n$ represents the start of the viewing angle for probe n. If necessary, extrapolation also can be used to determine the temperature value of points toward the substrate edge. The initial temperature value $\Delta T_{n0}$ for a particular probe n then is calculated by subtracting the mean value $T_{n(mean)}$ for the particular probe n from the mean temperature value $T_{1(mean)}$ for the probe positioned at the substrate center (i.e., n=1):

$$\Delta T_{n0} = T_{1(mean)} - T_{n(mean)} \qquad (EQ4)$$

The inverse matrix $G^{-1}$ is used to convert each initial temperature correction value $\Delta T_{n0}$ to a corresponding relative change in lamp voltage $dV_{uv}$, where $dV_{uv}$ is expressed as a percentage (step 208). In particular, $$dV_n = \Delta T_{n0} \times G^{-1}, \qquad (EQ5)$$

and the individual lamp voltages $dV_{u,v}$ are obtained based on the information in FIGS. 5 and 6. Thus, for example, $dV_1=dV_{-1,0}=dV_{0,0}$, and $dV_3=dV_{2,0}=dV_{1,1}=dV_{0,2}$.

To simulate the continuous differential temperature profile dT(k) (step 210), the temperature contribution of each lamp in the heating element 110 is modelled by a symmetric distribution having a peak amplitude and decreasing toward zero on either side of the peak. Thus, for example, the temperature contribution of each lamp can be modelled by a bell-shaped distribution, which for the purpose of the present invention, is defined as including, a Pearson distribution, including a normal distribution, as well as Gaussian and Gaussian-like distributions. The total temperature profile then can be determined by calculating the summation of the temperature profiles from each lamp. Since the lamp configuration is symmetrical, only the center lamp located at (−1,0) and one-sixth of the remaining lamps (see FIGS. 2 and 5) need be considered expressly, and other lamps located at a particular radial distance from the center are taken into account by using the single profile multiplied by the number of such lamps. Such a technique can reduce the amount of memory required and can increase the speed at which the algorithm is executed.

The peak amplitude from a given lamp is assumed to be at the particular radial position of the lamp. The amplitude of the peak depends on the lamp voltage. The simulated temperature profile dT(k) takes into consideration the contribution from the various lamps. In one specific implementation, $$dT(k) = C \sum_{u=-1}^{6} \sum_{v=o}^{6} \frac{1}{r_{u,v}} dV_{u,v} \left( \exp\left[ -\frac{(x(k)-L_{u,v})^2}{2(\Delta W)^2} \right] + \exp\left[ -\frac{(x(k)+L_{u,v})^2}{2(\Delta W)^2} \right] \right) \qquad (EQ6)$$

where dT(k) is expressed in degrees Celsius (° C.) and where the various terms in (EQ3) are as follows:

u,v indices identifying lamp;

C conversion constant (° C.);

$r_{u,v}$ number of lamps per radial distance from the center, where $r_{u,v}$=u+v+1 for u, v≧0, and $r_{-1,0}$=2;

$dV_{u,v}$ relative voltage change (%) for the lamp identified by indices (u,v);

x(k) radial distance (millimeters (mm)) of a point k from the center of the lamp array;

$L_{u,v}$ radial distance (mm) of the lamp identified by indices (u,v) from the center of the array;

Δw width of the Gaussian temperature distribution from a single lamp (mm); and k point resolution (e.g., k=[0, 1, 2, . . . , 24]).

The values for the conversion constant C and for the temperature distribution Δw are obtained experimentally. One technique for determining those values is to perform a rapid thermal oxidation process on a first test substrate in the chamber and to measure, for example, the oxide thickness profile of the processed substrate. An arbitrary non-zero temperature offset then is introduced for one of the temperature sensors 190, and an oxidation process is performed with a second test substrate in the chamber. The temperature offset can be, for example, +1° C. Measurements are made to determine the oxide thickness profile of the second test substrate, and the difference between the oxide thickness profiles for the first and second substrates is calculated. The oxide thickness differences then are converted to corresponding temperature differences. A temperature offset then is introduced for a different one of the temperature sensors 190, and the process is repeated. The process is repeated multiple times, with an offset for a different one of the temperature sensors 190 being changed each time the process is repeated. The experimentally-derived data, in conjunction with equations EQ1 and EQ6, then can be used to determine appropriate values for the conversion constant C and for the temperature distribution Δw. For example, with respect to the RTP Centura™ and the RTP Centura XE™, manufactured by Applied Materials, Inc., it has been found that for temperatures between approximately 900–1100° C., the conversion constant can be set to 3.8 and the width of the distribution Δw can be set to 28 mm.

Returning to FIG. 4, once the simulated temperature profile dT(k) is calculated using equation EQ6 (step 210), it is combined arithmetically with the measured temperature profile P(k) (step 212) to form an estimated profile E(k), where $$E(k)=dT(k)+P(k) \qquad (EQ7).$$

An optimization algorithm is performed to determine temperature correction values $\Delta T_n$ that generate a simulated temperature profile dT(k) such that the estimated profile E(k) is substantially uniform. In particular, the optimization algorithm determines the temperature correction values $\Delta T_n$ for the sensors 190 that minimize the value Z (step 214), where $$Z = \sigma E(k) \cdot D(E(k)) \qquad (EQ8),$$

and where σE(k) represents the standard deviation of E(k), and D(E(k)) represents a deviation of E(k) for all points k on the substrate weighted according to their radial position. Specifically, $$\sigma E(k) = \sqrt{\frac{(k_{max}+1)\sum_{u=o}^{k_{max}} x(k)^2 - \left(\sum_{u=o}^{k_{max}} x(k)\right)^2}{k_{max}(k_{max}+1)}}, \qquad (EQ9)$$

and $$D(E(k)) = \sum_{k=o}^{K_{max}} [(E_m - E(k))^2 \cdot x(k)] \qquad (EQ10A)$$

with $$E_m = \frac{1}{1+a}\sum_{k=0}^{a} E(k), \qquad (EQ10B)$$

where x(k) is the radial distance (mm) of a point k from the center of the lamp array, and "a" is set equal to or less than the maximum value of k. For example, "a" can be set to 10 when k has a maximum value equal to 24. Weighting the deviations as expressed in equation EQ10A takes into account the fact that for contour maps the number of points increases with radial position and, therefore, that deviations of points closer to the edge of the substrate impact the uniformity more strongly than points near the center. More generally, equation EQ10A reflects a technique for normalizing the deviations in the estimated profile E(k).

As the optimization algorithm is executed, interim values for the temperature correction values $\Delta T_n$ are determined, and steps 208, 210 and 212 are repeatedly performed until final values of the temperature correction values $\Delta T_n$ are obtained such that the value of Z as set forth in EQ8 is minimized. The optimization algorithm can be implemented, for example, using Microsoft Excel for Windows 95, Version 7.0, Add-In solver.xls, commercially available from Microsoft, Inc. Alternatively, other commercially available software packages also can be used.

Once the optimization algorithm determines the final temperature correction values $\Delta T_n$, the temperature correction values $\Delta T_n$ are used as offsets to adjust the temperature values obtained from the sensors 190 during the processing of substrates (step 216). Specifically, when a substrate is processed in the chamber, the controller 192 subtracts each temperature correction value $\Delta T_n$ from the temperature obtained from a corresponding one of the temperature sensors 190 prior to adjusting the power level of the heating lamps. In some systems, the correction values $\Delta T_n$ may be used in addition to other calculated temperature offsets.

In the technique described above, the profile M(k) of the measured temperature-related quantity, such as oxide thickness or resistivity, is converted to a corresponding temperature profile (step 204). In an alternative embodiment, instead of performing step 204, the profile M(k) of the measured temperature-related quantity can be combined arithmetically with the simulated temperature profile dT(k) to obtain an estimated profile E'(k), where, $$E'(k) = s \cdot dT(k) + M(k) \qquad (EQ11).$$

As before, an optimization algorithm then is performed to determine final temperature correction values $\Delta T_n$ that result in a substantially uniform estimated profile E'(k). Equations EQ8, EQ9, EQ10A and EQ10B can be used by replacing E(k) with E'(k).

Although the foregoing technique has been described in the context of a particular thermal processing system, the technique is generally applicable to other thermal processing systems in which it is necessary or desirable to obtain accurate temperature measurements of a substrate during processing. Moreover, the technique is not limited to any particular number of temperature sensors. Similarly, the foregoing technique can be used for substrates having diameters other than 200 mm, such as substrates having diameters of 150 mm or 300 mm. In various implementations, the system may include one or more temperature sensors 190.

Other implementations are within the scope of the following claims.

What is claimed is:

1. A method of tuning temperature sensor readings in a thermal processing chamber, the method comprising:
    (a) determining an actual temperature profile for a substrate based on measurements of the substrate;
    (b) calculating a simulated temperature profile for the substrate based on a respective interim temperature correction value for at least one of a plurality of temperature sensors associated with the chamber;
    (c) arithmetically combining the simulated temperature profile and the actual temperature profile to form an estimated temperature profile;
    (d) determining a final value for each respective temperature correction value by repeating (b) and (c) until the estimated temperature profile is substantially uniform across the surface of the substrate; and
    (e) using each final value as an offset to temperature measurements subsequently obtained from a corresponding at least one of the temperature sensors.

2. A method of tuning temperature sensor readings in a thermal processing chamber, the method comprising:
    (a) determining an actual profile of a temperature-related quantity for a substrate based on measurements of the substrate and converting the actual profile of the temperature-related quantity to an actual temperature profile;
    (b) calculating a simulated temperature profile for the substrate using a respective interim temperature correction value for at least one of the plurality of temperature sensors associated with the chamber;

(c) arithmetically combining the simulated temperature profile and the actual temperature profile to form an estimated profile;

(d) determining a final value for each respective temperature correction value by repeating (b) and (c) until the estimated profile is substantially uniform across the surface of the substrate; and (e) using each final value as an offset to temperature measurements subsequently obtained from a corresponding at least one of the temperature sensors.

3. The method of claim 1 or 2 wherein calculating a simulated temperature profile includes using a bell-shaped distribution for thermal contributions from each of a plurality of radiation sources in the chamber.

4. The method of claim 3 wherein calculating the simulated temperature profile includes determining a summation of temperature profiles from each of the radiation sources.

5. The method of claim 4 wherein calculating the simulated temperature profile includes using a peak amplitude for each radiation source located at a corresponding radial position of that radiation source.

6. The method of claim 3 wherein calculating a simulated temperature profile further includes converting each temperature correction value to a corresponding voltage change.

7. The method of claim 1 wherein determining the actual temperature profile includes measuring thicknesses of a layer deposited on the substrate by a thermal process.

8. The method of claim 7 wherein determining the actual temperature profile further includes converting the thickness measurements to the actual temperature profile.

9. The method of claim 1 wherein determining the actual temperature profile includes making resistivity measurements of a layer deposited on the substrate by a thermal process.

10. The method of claim 9 wherein determining the actual temperature profile further includes converting the resistivity measurements to the actual temperature profile.

11. The method of claim 1 wherein arithmetically combining the simulated temperature profile and the actual temperature profile includes calculating the sum of the actual temperature profile and the simulated temperature profile.

12. The method of claim 1 wherein determining a final value for each respective temperature correction value includes minimizing a value that is a function of a standard deviation of the estimated temperature profile.

13. The method of claim 12 wherein the value to be minimized is a function of a deviation of the estimated temperature profile for points on the substrate weighted according to radial position.

14. The method of claim 1 or 2 wherein calculating the simulated temperature profile includes calculating respective initial temperature correction values for a plurality of sensors.

15. The method of claim 14 wherein calculating respective initial temperature correction values includes:

calculating a mean temperature for each sensor based on the measurements of the processed substrate; and setting the initial temperature correction value for a particular sensor equal to a difference between the mean temperature for that sensor and a reference temperature, wherein the reference temperature corresponds to the mean temperature for one of the plurality of sensors.

16. A method of tuning temperature sensor readings in a thermal processing chamber, the method comprising:

(a) determining an actual temperature profile for a substrate based on measurements of the substrate;

(b) calculating a simulated temperature profile for the substrate based on respective interim temperature correction values for a plurality of temperature sensors associated with the chamber;

(c) arithmetically combining the simulated temperature profile and the actual temperature profile to form an estimated temperature profile;

(d) determining a final value for each respective temperature correction value by repeating (b) and (c) until the estimated temperature profile is substantially uniform across the surface of the substrate; and (e) using each final value as an offset to temperature measurements subsequently obtained from a corresponding one of the temperature sensors.

17. A system for tuning a plurality of temperature sensors that measure temperatures of a substrate, the system comprising:

a processor arranged to obtain an actual temperature profile for the substrate and configured to perform the following functions:

(a) calculate a simulated temperature profile for the substrate based on respective interim temperature correction values for the plurality of temperature sensors;

(b) arithmetically combine the simulated temperature profile and the actual temperature profile to form an estimated temperature profile;

(c) determine a final value for each respective temperature correction value by repeating (a) and (b) until the estimated temperature profile is substantially uniform across the surface of the substrate; and (d) use each final value as an offset to temperature measurements subsequently obtained from a corresponding one of the temperature sensors.

18. The system of claim 17 further including a plurality of radiation sources for heating the substrate, wherein the processor is further configured to calculate the simulated temperature profile using a bell-shaped distribution of thermal contributions from each of the plurality of radiation sources.

19. The system of claim 18 wherein the processor is further configured to determine a summation of temperature profiles from each of the radiation sources.

20. The system of claim 19 wherein the processor is further configured to calculate the simulated temperature profile using a peak amplitude for each radiation source located at a corresponding radial position of that radiation source.

21. The system of claim 17 further including a measurement device that obtains measurements of a temperature-related quantity from the substrate, wherein the processor is further configured to receive the measurements of the temperature-related quantity and to convert the measurements of the temperature-related quantity to the actual temperature profile.

22. The system of claim 17 further including a measurement device that obtains thickness measurements of the substrate, wherein the processor is further configured to receive the thickness measurements and to convert the thickness measurements to the actual temperature profile.

23. The system of claim 17 further including a measurement device that obtains resistivity measurements of the substrate, wherein the processor is further configured to receive the resistivity measurements and to convert the resistivity measurements to the actual temperature profile.

24. The system of claim 17 wherein the processor is configured to calculate the sum of the actual temperature profile and the simulated temperature profile to obtain the estimated temperature profile.

25. The system of claim 17 wherein the processor is further configured to minimize a value that is a function of a standard deviation of the estimated temperature profile to obtain the final value for each respective temperature correction value.

* * * * *